2,714,105

BENZOXAZINE DIONES AND METHODS OF PREPARING THE SAME

William B. Wright, Jr., Plainfield, N. J., assignor to American Cyanamid Company, New York, N. Y., a corporation of Maine No Drawing. Application December 31, 1953, Serial No. 401,725

10 Claims. (Cl. 260—244)

This invention relates to new organic compounds. More particularly, it relates to 3-hydroxy-1,3-benzoxazine-2,4-dione and derivatives thereof.

In the past 1.3-benzoxazine-2,4-diones have been prepared and described in the literature. Compounds of this type having a hydroxy group in the 3-position have not been described and therefore are new compounds.

The compounds of the present invention can be illustrated by the following structural formula:

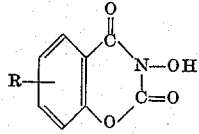

in which R is a member of the group consisting of hydrogen, halogen and hydroxyl radicals.

These compounds are, in general, high melting crystalline solids which can usually be recrystallized from alcohols. They are insoluble in water and under some conditions decompose in the presence of aqueous alkali.

The compounds of the present invention are prepared by reacting a salicylhydroxamic acid with ethyl chloroformate in the presence of an alkaline catalyst. In order to obtain best results we have found that at least two moles of ethyl chloroformate to each mole of hydroxamic acid should be used, although the desired compounds can be prepared using a lower ratio of starting materials. The reaction which takes place may be illustrated by the following equation:

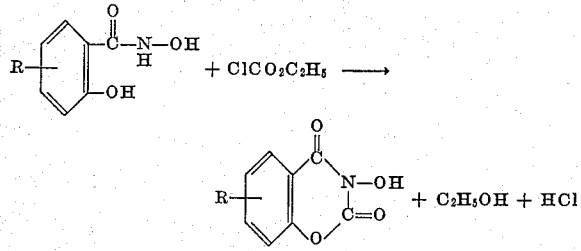

in which R is as previously defined. The salicylhydroxamic acids used as starting materials are known compounds which have been described in the chemical literature. These compounds may be, for example, salicylhydroxamic acid itself, 5-bromosalicylhydroxamic acid, 5-hydroxysalicylhydroxamic acid, 5-chlorosalicylhydroxamic acid, and the like. These starting materials are reacted with ethylchloroformate to produce the 1,3-benzoxazine-2,4-dione compounds.

The process of the present invention is carried out in the presence of an alkaline substance which acts as a catalyst in causing condensation and ring formation. The preferred alkaline catalyst is pyridine, which can also serve as a solvent. Other alkaline catalysts which may be used are aromatic amines, trialkylamines, quaternary ammonium compounds, etc.

In carrying out the reaction it is usually not necessary to use a separate solvent as an excess of pyridine or other alkaline substance can be used. However, if a solvent is desired, an inert solvent such as chloroform, carbon tetrachloride, methyl dichloride, toluene, diethyl ether, dibutyl ether, benzene or the like may be used.

The reaction to prepare the compounds of the present invention is generally completed by heating the reaction mixture on the steam bath. In general, the temperature may range from about 40° to about 100° C. The time required for completing the reaction may vary from thirty minutes to several hours.

The compounds of the present invention have been found to possess fungicidal, antispasmodic and sedative activity.

The following examples describe in detail the preparation of representative 3-hydroxy-1,3-benzoxazine-2,4-diones of the present invention. All parts are by weight unless otherwise indicated.

EXAMPLE 1

*3-hydroxy-1,3-benzoxazine-2,4-dione*

A solution of 30.6 parts of salicylhydroxamic acid in 100 parts by volume of pyridine is adjusted to 25°–30° C. and 45.6 parts of ethyl chloroformate is added at this temperature. The reaction is heated on the steam bath for one and one-half hours, cooled, and then poured into ice water. The precipitate which separates is filtered, water washed and oven dried. When this material is recrystallized from ethanol, pure 3-hydroxy-1,3-benzoxazine-2,4-dione is obtained in about 50% yield. The melting point is 235–6° C.

EXAMPLE 2

*6-bromo-3-hydroxy-1,3-benzoxazine-2,4-dione*

To a mixture of 46.2 parts of 5-bromosalicylhydroxamic acid and 100 parts by volume of pyridine is added 43.4 parts of ethyl chloroformate. The reaction is heated in the steam bath for two hours and the insoluble portion filtered off. The filtrate is poured into water for additional product. When these precipitates are suspended in water, acidified with hydrochloric acid, filtered, water washed and oven dried, 43.5 parts of crude product are obtained. Recrystallization from ethanol gives pure 6-bromo-3-hydroxy-1,3-benzoxazine-2,4-dione as white needles melting at 185°–187° C.

EXAMPLE 3

*3,6-dihydroxy-1,3-benzoxazine-2,4-dione*

To 33.8 parts of 5-hydroxysalicylhydroxamic acid and 100 parts by volume of pyridine is added 43.2 parts of ethyl chloroformate. The reaction is heated on the steam bath for one hour, cooled and poured into water. The oil which separated is washed well with dilute hydrochloric acid and crystallization occurred. On recrystallization from ethanol, pure 3,6-dihydroxy-1,3-benzoxazine-2,4-dione precipitates as white needles melting at 245–6° C.

I claim:

1. A compound having the formula:

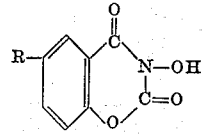

in which R is a member of the group consisting of hydrogen, halogen and hydroxyl radicals.
2. A 6-halo-3-hydroxy-1,3-benzoxazine-2,4-dione.
3. 3-hydroxy-1,3-benzoxazine-2,4-dione.
4. 6-bromo-3-hydroxy-1,3-benzoxazine-2,4-dione.
5. 3,6-dihydroxy-1,3-benzoxazine-2,4-dione.

6. A method of preparing compounds having the formula:

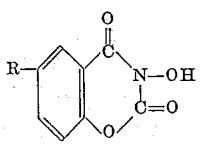

in which R is a member of the group consisting of hydrogen, halogen and hydroxyl radicals which comprises heating a hydroxamic acid having the formula:

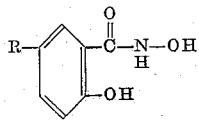

in which R is as defined above, with ethyl chloroformate in the presence of an alkaline substance of the group consisting of pyridine bases and tertiary amines.

7. A method of preparing a 6-halo-3-hydroxy-1,3-benzoxazine-2,4-dione which comprises heating to a temperature within the range of 40° C. to 100° C. a 5-halosalicylhydroxamic acid with ethyl chloroformate in the presence of pyridine.

8. A method of preparing 3-hydroxy-1,3-benzoxazine-2,4-dione which comprises heating to a temperature within the range of 40° C. to 100° C. salicylhydroxamic acid with ethyl chloroformate in the presence of pyridine.

9. A method of preparing 6-bromo-3-hydroxy-1,3-benzoxazine-2,4-dione which comprises heating to a temperature within the range of 40° C. to 100° C. 5-bromosalicylhydroxamic acid with ethyl chloroformate in the presence of pyridine.

10. A method of preparing 3,6-dihydroxy-1,3-benzoxazine-2,4-dione which comprises heating to a temperature within the range of 40° C. to 100° C. 5-hydroxysalicylhydroxamic acid with ethyl chloroformate in the presence of pyridine.

References Cited in the file of this patent

UNITED STATES PATENTS 2,476,559   Nawiasky et al. _____ July 19, 1949